Dec. 30, 1958 D. R. ANDREWS 2,866,857

PHONOGRAPH PICKUP

Filed Dec. 20, 1955

INVENTOR.
Dallas R. Andrews
BY H. L. Newton
ATTORNEY.

United States Patent Office
2,866,857
Patented Dec. 30, 1958

2,866,857

PHONOGRAPH PICKUP

Dallas R. Andrews, Collingswood, N. J., assignor to Radio Corporation of America, a corporation of Delaware Application December 20, 1955, Serial No. 554,192

4 Claims. (Cl. 179—100.41)

This invention relates to vibration translating devices such as phonograph pickups, and more particularly to phonograph pickups of the variable reluctance type wherein the flux in a magnetic path is varied in accordance with the vibrations of a phonograph stylus.

In phonograph pickups or other vibration translating devices, it is desirable that an output voltage be produced, in response to the movement of a vibratile element, which is high enough to eliminate the need for additional preamplifier stages. It is also considered desirable that the pickup be responsive to the amplitude rather than the velocity of the stylus travel. Piezoelectric crystal pickups or ceramic pickups, for example, possess the aforementioned characteristics. However, piezoelectric pickups have certain disadvantages such as high output impedance which tends to produce noise in amplifiers used therewith. Furthermore, these pickups have a relatively high dynamic mechanical impedance which limits the upper frequency range of the pickup.

Magnetic or reluctance pickups on the other hand have a relatively low output impedance and can be constructed to have a low dynamic mechanical impedance. However, magnetic pickups in general have a relatively low output voltage. Furthermore, magnetic pickups are responsive to the velocity of stylus motion and therefore require circuit compensation so that the output signal voltage therefrom may be made relatively constant over the frequency range in which the pickup is operative.

It is an object of the present invention to provide an improved phonograph pickup in which the aforementioned and other advantages of both magnetic and piezoelectric pickups are realized.

Another object of this invention is to provide an improved variable reluctance phonograph pickup which is responsive to the amplitude of stylus travel.

It is still another object of this invention to provide an improved phonograph pickup which has a relatively high output voltage and is responsive to the amplitude of stylus travel, yet has a relatively low output impedance and low dynamic mechanical impedance.

In accordance with the invention, a magnetic structure is provided in which magnetic flux is modulated in accordance with the relative displacement of a vibratile element. A semiconductor generator element, which may comprise a thin wafer of germanium is positioned in the magnetic structure so that the plane of the semiconductor wafer is effectively at right angles to magnetic flux lines of force. A biasing voltage is applied to the semiconductor element and a signal voltage corresponding to the magnetic flux variations is developed and appears across opposite edges or sides of the semiconductor element.

The novel features which are considered characteristic of this invention are set forth with particularity in the appended claims. The invention, itself, however, both as to its organization and method of operation, as well as additional objects and advantages thereof, will best be understood from the following description when read in connection with the accompanying drawings, in which:

Figure 1:
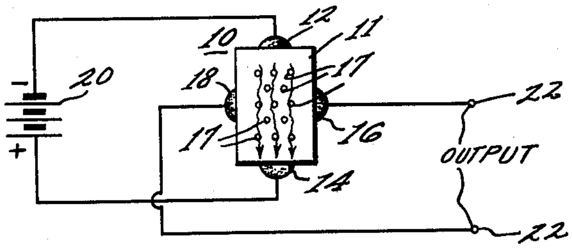
Figure 1 is an enlarged top view of a semiconductor device connected to operate as a vibration translating device in accordance with the invention.

Referring now to the drawings, in which like components in the various figures are designated by the same reference numerals, and particularly to Figure 1, a semiconductor device 10 is provided as a generator element for use in a phonograph pickup or other vibration translating device. The semiconductor device 10 may, for example, comprise a thin wafer or body 11 of germanium or silicon with the flat opposing major faces preferably rectangular in configuration and with a thickness dimension of the order of 10 mils (0.010 inch). Four spaced circuit connection terminals 12, 14, 16 and 18 are provided for the device 10 in non-rectifying contact with the opposite edges of the body or wafer 11, in pairs as indicated. For example, the circuit connection terminals 12 and 14 are located on two opposite edges as shown and are connected to a source of potential such as a battery 20 which provides biasing voltage across the semiconductive body 11. A pair of output terminals 22 for the generator element are connected respectively to the terminals 16 and 18 which are affixed to two other opposite edges of the semiconductor body 11.

When the battery 20 is connected to the circuit connection terminals 12 and 14, charge carriers travel through the semiconductor body 11 between the terminals 12 and 14. A magnetic field which is indicated by the small circles 17 extends perpendicular to the major faces of the semiconductor device 10, that is, perpendicular to the plane of the drawing. The magnetic field, due to what is known as the Hall effect, causes the path of the charge carriers to be deviated, laterally as viewed in the drawing, toward one or the other of the circuit connection terminals 16 and 18, thereby producing an output potential, or potential difference, between these terminals which is a function of the strength and direction of the magnetic field. If the magnetic field is modulated in accordance with a predetermined signal, a corresponding modulation signal voltage appears at the circuit connection terminals 16 and 18. The impedance between the terminals 16 and 18 is relatively low and on the order of that of conventional magnetic pickups.

The modulated magnetic field is developed by a magnetic structure, one form of which is to be described hereinafter with respect to Figures 2 and 3, wherein the modulation is effected by the displacement of a vibratile pickup element. Constant magnetic bias field may be applied to the semiconductor device 10 in addition to the modulated magnetic field where desirable for certain applications of the invention.

Figure 2:
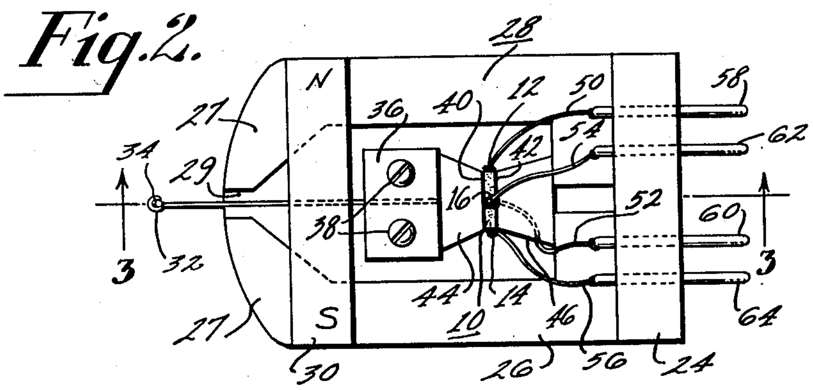
Figure 2 is a top view of a phonograph pickup unit embodying the device of Figure 1 and constructed in accordance with the invention.
Figure 3:
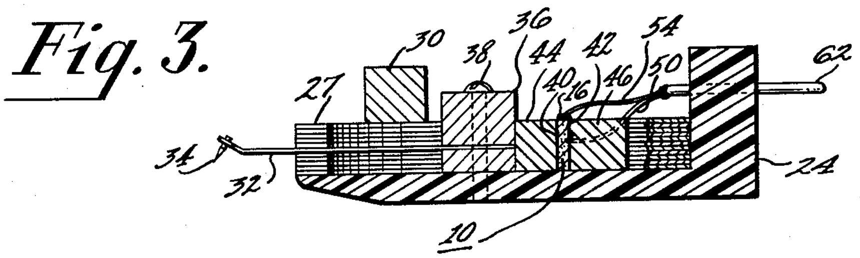
Figure 3 is a sectional view of the phonograph pickup unit shown in Figure 2, taken on the section line 3—3, to show further details of construction in accordance with the invention.

Referring now to Figure 2, a phonograph pickup embodying the invention may include a base member 24 formed of any suitable diamagnetic material such as Bakelite. The base member 24 is adapted to receive and position a pair of elongated laminated cores 26 and 28 of ferro-magnetic material, which form the pole pieces for the pickup. The pole pieces may be cemented or otherwise attached to the base member 24 and may be of any suitable ferromagnetic material such as pressed powdered iron for example. The pole pieces 26 and 28 are positioned substantially parallel in spaced relation to each other along opposite sides of the base member 24 and have adjacent forward end portions 27—27 which project inwardly to form a relatively narrow magnetic air gap 29.

A permanent magnet 30 which provides a source of magnetic flux of constant magnitude is cemented or otherwise fixed in position transversely of the pickup body so that the opposite poles thereof are in contact with the pole pieces 26 and 28 respectively. The magnet 30 is preferably formed of a suitable aluminum, nickel, cobalt alloy. The vibrating system for the magnetic pickup of the invention includes a stylus arm 32 of low reluctance magnetic material. The stylus arm shown is formed of piano wire and has a circular cross-section, but could as well have a rectangular cross-section to increase the stiffness thereof in one plane or another as is well known in the art.

The stylus arm 32 supports at one end thereof a stylus 34 such as a sapphire or diamond. The stylus 34 has a record engaging tip having a diameter of 1 mil which is the proper diameter for use with conventional long playing or microgroove records. The opposite end of the stylus arm 32 is anchored to a ferro-magnetic stylus arm support block 36 which is fastened to the insulating base member 24 by means of a pair of screws 38.

The semiconductor generator element 10 is sandwiched between a pair of ferro-magnetic blocks 44 and 46. The semiconductor generator element is insulated from the ferro-magnetic blocks 44 and 46 by a pair of thin sheets of suitable insulating material 40 and 42 which are in contact with the respective major faces of the generator element 10. As described above in conection with Figure 1, the semiconductor generator element 10 has a pair of circuit connection terminals 12 and 14 for conection with a suitable source of biasing potential, and also a pair of circuit connection terminals 16 and 18 across which the output voltage appears.

A closed low reluctance magnetic circuit or flux path connects the poles of the permanent magnet through rearwardly extending conjugate portions of the pole pieces 26 and 28, and the ferro-magnetic block 46 which bridges the gap, between the pole pieces. A constant or D. C. magnetic flux flows through this path. An alternate low reluctance magnetic circuit or flux path is provided between the poles of the magnet 30 including the stylus 34, which is disposed in the air gap 29 formed by the forwardly extending portions 27—27 of the pole pieces 26 and 28, the stylus supporting block 36, and the ferromagnetic blocks 44 and 46 between which is sandwiched the semiconductor generator 10. As mentioned above, the ferromagnetic block 46 is magnetically connected with and bridges the gap between the rearwardly extending portions of the pole pieces 26 and 28. It can be seen that the semiconductor generator element 10 is positioned so that the flat opposing major faces thereof are normal to the magnetic flux lines in the alternate path or circuit.

When the stylus arm 32 is centered in the air gap formed at the forward end of the pickup unit, as shown in Figure 2, theoretically no magnetic flux should flow through the alternate magnetic flux path. In other words, the magnetic potential at either end of the alternate flux path should be equal. As the stylus arm is laterally displaced in one direction or the other from the centered position, the reluctance to the magnetic lines of force from the closer pole piece will decrease, while at the same time the reluctance to the other pole piece will increase. This displacement therefore causes a differential flux to flow through the alternate path, the magnitude of which is a function of the displacement of the stylus member 32. This magnetic flux will cause an output voltage to appear across the circuit connection terminals 16 and 18 of the semiconductor 10 which will be a function of the displacement of the stylus arm 32, in accordance with the principle of operation described in connection with the device and circuit connections of Figure 1.

When the stylus arm 32 is shifted toward the opposite end of the pole piece, the magnetic flux through the alternate flux path, including the semiconductor generator element, will flow in the opposite direction. This will cause a corresponding change of polarity of the output voltage appearing across the circuit connection terminals 16 and 18.

Specifically, if the stylus is moved toward the pole piece 28 which is connected with the north pole of the permanent magnet 30, the reluctance from the forward end of the pole piece 28 to the stylus 32 will be decreased, while the reluctance from the forward end of the pole piece 26 to the stylus 32 will be increased. Therefore more flux will flow in a first direction through the alternate flux path from the north pole, which path includes: the forward end 27 of the pole piece 28; the stylus 32 and the stylus supporting block 36; the ferromagnetic blocks 44 and 46 between which is sandwiched the semiconductor generator 10; and the rearward portion of the pole piece 26 back to the south pole of the permanent magnet 30. Conversely, if the stylus 32 is moved closer to the pole piece 26 which is connected to the south pole of the magnet 30, more flux will flow in the opposite direction through the alternate flux path. In this case, the flux will flow from the north pole through the rearward portion of the pole piece 28; the ferromagnetic blocks 44 and 46 and the semi-conductor generator 10; the stylus arm 32; and the forward portion 27 of the pole piece 26 to the south pole of the magnet 30.

The insulating base member 24 has an integral upstanding rear end portion which supports the pickup contact terminals 58, 60, 62 and 64. The pickup circuit connection terminals 12 and 14 of the semiconductor generator element 10 are connected to the contact terminals 58 and 64 through conductors 50 and 56. The terminals 60 and 62 are connected to the signal output connection terminals 18 and 16 of the semiconductor generator element 10 through conductors 52 and 54. The terminals 60 and 62 may be suitably connected with an audio amplifier (not shown) for amplification and reproduction of the output signal.

The magnetic semiconductor vibration translating device or pickup of the invention is adapted to be carried in the free end of the tone arm of a phonograph record player. When installing the pickup unit of the invention in a tone arm, it can be seen that the unit shown and described must be mounted at an angle to the tone arm so that the forward end of the pickup which is the left-hand end as viewed in Figure 3 extends downwardly to permit the stylus 34 to engage the record free and clear of the pickup body. The axis of the stylus is then substantially vertical, but "trailing" with respect to the groove. It should be understood that the vibration translating device of the invention may be embodied in other magnetic structures without departing from the spirit and teachings of the invention as illustrated herein.

The vibration translating device described includes a simple and inexpensive generating element which provides relatively high output signal voltage as a function of the amplitude displacement of the vibratile element. A translating device in accordance with the invention when employed as a phonograph pickup additionally provides the advantages of a relatively low output impedance and a low dynamic mechanical impedance thereby enabling an extremely wide frequency range of operation with low distortion.

What is claimed is:

1. A magnetic phonograph pickup comprising in combination, a generator comprising a substantially rectangular semiconductor wafer having flat opposing major faces, first circuit connection means on opposite edges of said semiconductor wafer for connection with a bias potential source, second circuit connection means on the remaining opposite edges of said semiconductor wafer for connection to a utilization device, permanent magnet means for providing a source of magnetic flux of constant magnitude, means providing a magnetic flux path through said semiconductor wafer and effectively normal to the major faces thereof, a vibratile stylus arm for said pickup, and means including said vibratile member for modulating the magnetic flux through said semiconductor wafer to produce an output voltage across said second circuit connection means in accordance with the displacement of said vibratile stylus arm.

2. A magnetic phonograph pickup comprising in combination a generator comprising a substantially rectangular semiconductor wafer having flat opposing major faces, first circuit connection means on opposite edges of said semiconductor wafer for connection with a bias potential source, second circuit connection means on the remaining opposite edges of said semiconductor wafer for connection to a utilization device, permanent magnet means having a pair of opposite poles for providing a source of magnetic flux of constant amplitude, a vibratile stylus arm for said translating device, means including at least a portion of said stylus providing a magnetic flux path between said poles, said flux path including said semiconductor wafer and an air gap adjacent said stylus so that movement of the stylus varies the air gap and changes the reluctance of the flux path, said semiconductor wafer being positioned so that the major faces thereof are substantially normal to the magnetic lines of force in said flux path.

3. A magnetic phonograph pickup comprising in combination an insulating base member; a pair of ferromagnetic pole pieces supported in spaced relation on said base member to provide a magnetic air gap toward one end of said base member; permanent magnetic means having a pair of opposite poles magnetically connected with said pole pieces respectively; portions of said pole pieces extending toward the opposite end of said base member from said magnetic air gap connected between said poles and providing a first magnetic flux path; a ferromagnetic stylus arm supported for vibration in said magnetic gap; an alternate magnetic flux path being provided through said stylus arm to both of said pole pieces at said opposite end of said base member, a semiconductor wafer having flat opposing major faces positioned in said alternate magnetic flux path so that the major faces thereof are effectively normal to the magnetic lines of force in said alternate flux path, first circuit connection means for said semiconductor wafer for connection with a bias potential source, and second circuit connection means for said semiconductor wafer for connection to a utilization device.

4. A magnetic phonograph pickup comprising in combination, a generator comprising a semiconductor wafer having flat opposing major surfaces, first circuit connection means on opposite edges of said semiconductor wafer for connection with a bias potential source, second circuit connection means on opposite edges of said semiconductor wafer displaced from said first circuit connection means for connection to a utilization device, permanent magnet means for providing a source of magnetic flux, means providing a magnetic flux path through a semiconductor wafer and effectively normal to the major surfaces thereof, a vibratible stylus arm for said pickup, and means including said vibratible member for modulating said flux through said wafer to produce an output voltage across said first circuit connection means in accordance with the displacement of said vibratible stylus arm.

References Cited in the file of this patent

UNITED STATES PATENTS

| | | |
|---|---|---|
| 2,553,491 | Shockley | May 15, 1951 |
| 2,640,170 | Shaw et al. | May 26, 1953 |